E. EISELT.
AUTOMATIC EMERGENCY BRAKE FOR AUTOMOBILES.
APPLICATION FILED AUG. 26, 1910.
979,938.
Patented Dec. 27, 1910.
2 SHEETS—SHEET 1.
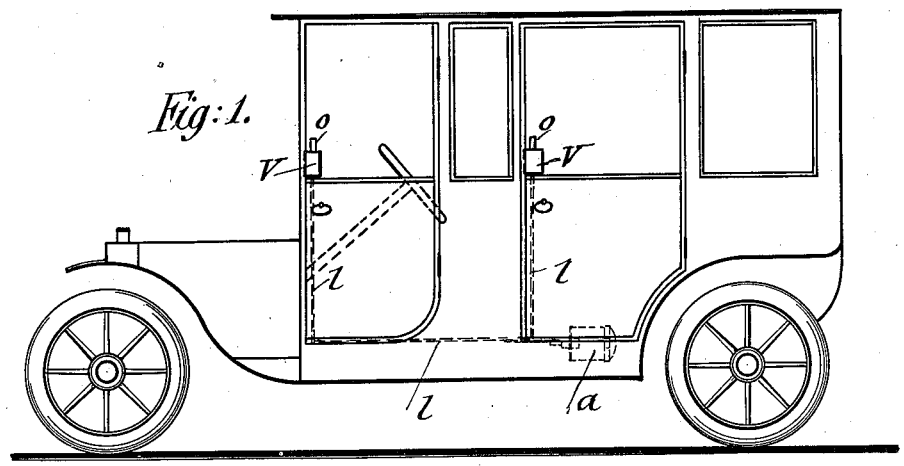
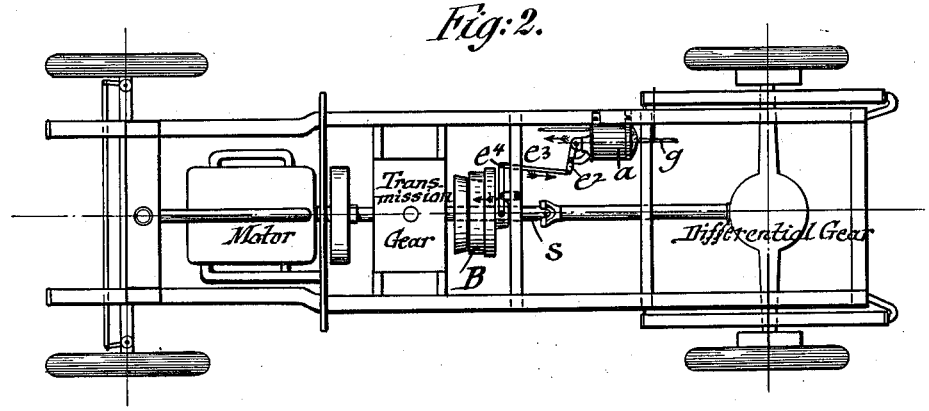
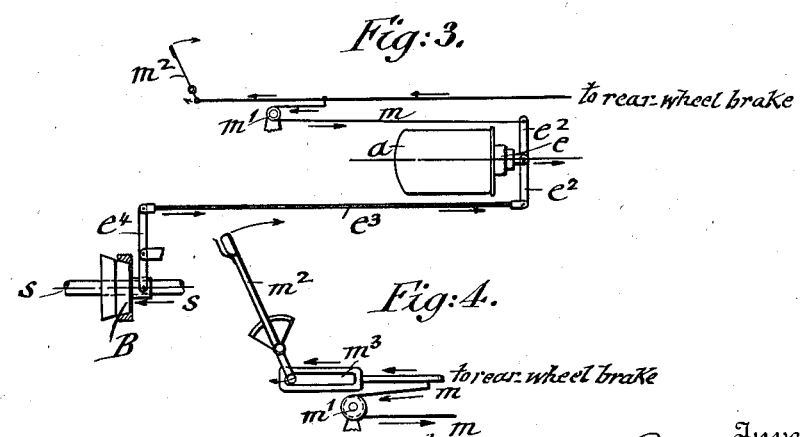

E. EISELT.
AUTOMATIC EMERGENCY BRAKE FOR AUTOMOBILES.
APPLICATION FILED AUG. 26, 1910.
Patented Dec. 27, 1910.
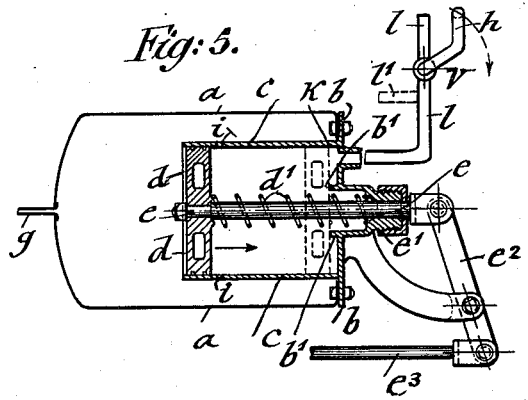
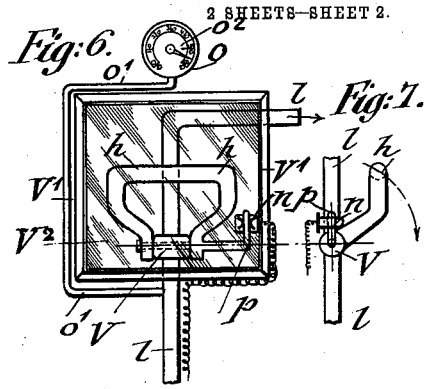
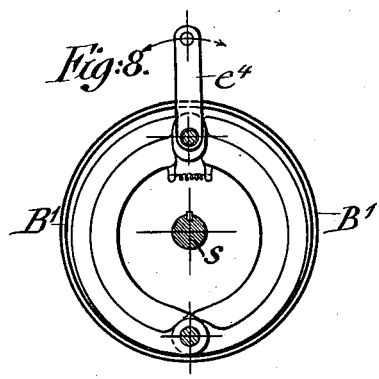
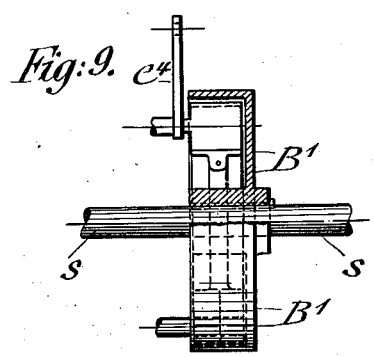
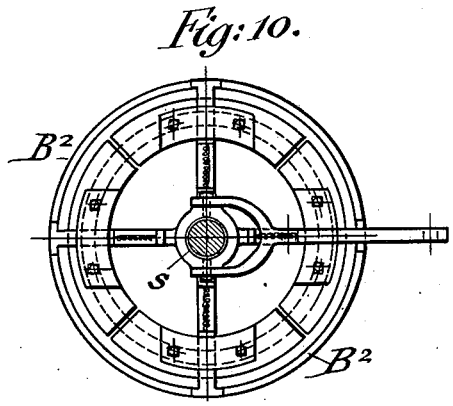
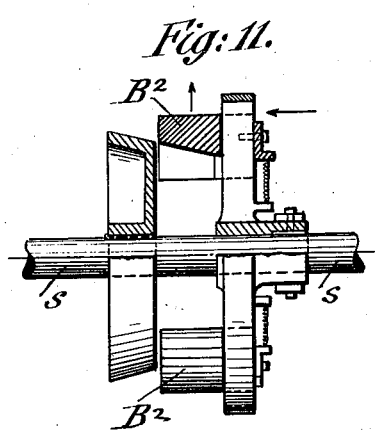

UNITED STATES PATENT OFFICE.

EMIL EISELT, OF BALTIMORE, MARYLAND.

AUTOMATIC EMERGENCY-BRAKE FOR AUTOMOBILES.

979,938.  Specification of Letters Patent.  Patented Dec. 27, 1910.

Application filed August 26, 1910. Serial No. 579,104.

*To all whom it may concern:*

Be it known that I, EMIL EISELT, a subject of the Emperor of Austria-Hungary, residing in the city of Baltimore and State of Maryland, have invented certain new and useful Improvements in Automatic Emergency-Brakes for Automobiles, of which the following is a specification.

This invention relates to an improved automatic emergency brake for automobiles. There is great danger to the occupants of an automobile in case anything should happen to the chauffeur. In this case, if one of the occupants of an open car knows how to stop the motor and put on the brakes, the danger could be avoided by quick action, but in a closed car, and with no one of the occupants conversant with the mechanism of the car, the danger of accident is greatly augmented. Furthermore, many times an imminent danger may not be noticed by the chauffeur but by one of the occupants of the car. Heretofore no means were provided by which the quick stopping of the automobile could be obtained, and consequently many accidents occurred which might have been avoided if the car could be stopped quickly and independently of the chauffeur. While in open cars the attention of the chauffeur can be drawn to any danger, it is more difficult in automobiles with closed bodies in which the persons are separated by doors and windows from the chauffeur. Further, if anything should happen to one of the persons in the car, there is no possibility of stopping the car quickly and without the aid of the chauffeur. This applies also, with considerable force, to taxicabs, which ought to be provided with emergency devices for the protection of the passengers.

The object of this invention is to provide means for quickly and automatically stopping an automobile, either directly by the chauffeur or by any one of the occupants, so that accidents and injury to the automobile and the persons riding in the same can be effectively obviated; and for this purpose the invention consists of an automatic emergency-brake which comprises a power device operated by compressed air, a lever mechanism connecting said power device, a friction or other brake, and an emergency-valve operated by a handle and preferably located on the inside of the car-body or on the dash-board, or both, said emergency-valve also interrupting the igniter-current for the motor so as to simultaneously apply the brake and stop the motor.

The invention consists further of the specific construction of the motor-device and of certain additional details of construction which will be fully described hereinafter and finally pointed out in the claims.

In the accompanying drawings, Figure 1 represents a side-elevation of an automobile with a closed body, showing my improved automatic emergency-brake and two emergency-valves, one arranged on the dashboard, within reach of the chauffeur, and one on the inside of the car-body, Fig. 2 is a plan-view of the car frame, with the body removed, showing the position of the emergency-brake and its connection with the power-cylinder, Fig. 3 is a diagram showing a plan-view of a combination brake, showing the power-cylinder in connection with the usual rear-wheel hand-brake and with an automatic emergency-brake, Fig. 4 is a diagram, showing the connection of the hand-lever for the rear wheel-brake with the power-cylinder of the emergency-brake, Fig. 5 is a vertical central section through the power-cylinder and its connection with the lever-mechanism for operating the emergency-brake and with the emergency-valve, drawn on a larger scale, Figs. 6 and 7 are respectively a detail front-view of the emergency-valve and a side-view of the same, Figs. 8 and 9 are respectively an end-elevation and a side-view partly in vertical section of an expansion-brake, and Figs. 10 and 11 are respectively an end elevation and a side-elevation partly in section of a brake with sliding exterior brake-shoes.

Similar letters of reference indicate corresponding parts throughout the different figures.

Referring to the drawings, $a$ represents a cylindrical tank which is made of sheet-metal, preferably sheet-steel, and strapped to the frame of the car by straps. The end of the tank $a$ is closed by a head $b$, which is attached thereto by a packing ring and bolts. In the tank and attached to the head $b$ is an air-cylinder $c$, which is open at its inner end, and in which is located a piston $d$, the piston-rod $e$ of which passes through a stuffing-box $e^1$ to the outside of the tank and is connected by a suitable lever-mechanism $e^2$, $e^3$, with the fulcrumed lever $e^4$ of an emergency-brake B of any approved construction, which is located on the motor-shaft S of the automobile. The opposite end of the tank is provided with a pipe $g$ which is connected with a hand air-pump for supplying the tank with air under pressure. If desired, a small pump can be connected with the pipe $g$, which pump can be driven either by the motor or by the exhaust of the same. It is preferable, however, to supply the tank with air by the ordinary air-pump, as this would not take more time than pumping up an ordinary pneumatic tire. Between the piston $d$ and the head $b$ of the tank $a$ is interposed a helical spring $d^1$ which assists in returning the piston to its initial position after the emergency-brake has been called into action. As the pressure of the air in the tank $a$ would force the piston in the direction of the arrow shown in Fig. 5, small holes $i$ are arranged in the cylinder at a short distance from its inner end and to the rear of the normal position of the piston $d$, which holes, together, should be about approximately equal to the cross-sectional area of the air supply-pipe $g$ and which permit the air to enter into the space between the piston and the head $b$ so that an equalization of pressure in the tank $a$ and cylinder $c$ is obtained. The spring $d^1$ serves for holding the piston in the proper position at its inner end of the cylinder $c$, as shown in Fig. 5. The spring $d^1$ is made of thin wire and can be compressed by the piston to about one inch. It is assumed that a pressure of about 50 lbs. to the square inch should be established and maintained at the interior of the air-tank and air-cylinder.

The air-cylinder $a$ is connected by a pipe $l$ with an emergency-valve V, which is arranged in a box $V^1$ provided with a transparent cover $V^2$, that is preferably made of transparent paper or other suitable material, so that it can be easily broken by the hand without opening the cover of the box. The valve is provided with a handle $h$, which can be seen from the outside through the transparent cover. The transparent cover $V^2$ may be provided with a suitable notice, such as "Emergency-brake", "Pull handle" or the like. The valve V holds the pipe $l$ in closed position, its stem being extended sidewise and provided with a short lever-arm $p$, which is held in position by a clamping contact $n$ in the electric igniting circuit of the motor. The clamping contact $n$ holds, by its friction on the short lever-arm $p$, the handle of the emergency-valve V in upright position, so that it requires some force for moving the same in downward direction. A pressure-gage $o$ is arranged near the emergency-valve V and connected by a branch-pipe $o^1$ with the pipe $l$, as shown in Fig. 6, the pressure-gage indicating the air-pressure in the tank. A special mark $o^2$ on the dial of the gage indicates the minimum pressure and draws the attention of the occupants, as well as of the chauffeur, to the lowering of the pressure and the reëstablishment of the same whenever required. One emergency-valve is preferably arranged in the body of the car, and a second one on the dashboard near the seat of the chauffeur, the second emergency-valve being connected by a branch pipe $l^1$, shown in dotted lines in Fig. 5, with the air-pipe $l$. If desired, a third, or even a fourth, emergency-valve may be arranged in the automobile, especially in larger types of the same.

Whenever the emergency-brake should be called into action in case of a sudden danger or emergency, the transparent cover of the emergency-valve-box is broken by the hand and the handle $h$ quickly moved in downward direction. By this action the emergency-valve opens the pipe $l$ and permits the compressed air to pass quickly through the pipe $l$ into the atmosphere. At the same time the air in the tank $a$ forces the piston $d$ forward, so that the small holes $i$ are placed out of action. The piston is moved for the distance of about one inch from the head of the tank until it is arrested by an inwardly-projecting stop $b^1$ on the head $b$ of the tank. The piston-rod transmits by the intermediate lever-mechanism the power to the emergency-brake B. The piston assumes then the position shown in dotted lines in Fig. 5 and is retained in this position. Simultaneously with the downward motion of the handle the small lever $p$ is moved clear of the clamping contact $n$, so that the ignition-circuit to the motor is interrupted and the latter instantly stopped.

For returning the piston to its normal position under the influence of the spring $d^1$, a very small orifice $k$ is arranged in the cylinder near the head $b$, through which orifice the air can pass from the tank $a$ into the space between the piston and the head $b$, and through the pipe $l$ to the atmosphere. For releasing the emergency-brake and bringing the motor-car into condition for motion, it is necessary to return the handle $h$ and thereby the emergency-valve into their former positions. By means of the small hole $k$ sufficient air will soon pass into the space between the piston and head $b$, so that sufficient pressure is exerted on the piston that it will be returned, assisted by the spring $d^1$, to its former normal position, as shown in full lines in Fig. 5. The ingress of air through the holes $i$ from the cylinder assists in this return motion as soon as the piston has passed the same, and reëstablishes the normal condition of the parts. The dimensions of the air-tank and air-cylinder have to be in proportion to the size of the automobile. By shortening the cylinder $b$, and also the stroke of the piston, the diameter and area of the piston have to be enlarged so that the same pressure on the piston is obtained.

The minimum pressure in the tank should be about 50 lbs. to the square inch, but the pressure can also be raised to from 60 to 70 lbs. per square inch, as even when all the parts are tightly fitted there will be a slight leakage and after a few months a gradual lowering of the pressure down to 50 lbs., which is the normal pressure desired. The air-tank and piston can be arranged at any suitable point on the frame of the car, while the emergency-brake is preferably arranged adjacent to the transmission-gear on the driving shaft. The emergency-brake can also be arranged at any other point, in case it should not be desirable to place it on the motor-shaft. The lever mechanism between the power-cylinder and emergency-brake B has to be arranged according to their relative positions. The piston may also be connected by a wire-cord $m$, which is passed over a pulley $m^1$ on the frame, with the rear-wheel brake and its hand-lever $m^2$ as shown in diagrams Figs. 3 and 4, so that both the emergency-brake B and rear-wheel brake may be simultaneously called into action. In this case the hand-lever has to be guided in a sleeve or link $m^3$ to permit the action of the emergency-brake freely and independently of the position of the hand-lever, as the latter, being held in position, would impede the free use of the emergency-brake. In place of the wire-cord, two small air-cylinders may be used, of which one actuates the friction-disk of the emergency-brake, while the other actuates the rear-wheel brake. Both these cylinders can be supplied simultaneously with air from the emergency-valve.

The dimensions of the air-cylinder and piston and the location of the same, the lever-transmission to the emergency brake and the construction of the brake, depend on the type of automobile to which the emergency-brake is applied. The emergency-brake itself may be a so-called expansion-brake $B^1$, as shown in Figs. 8 and 9, or a brake with sliding brake-shoes $B^2$ as shown in Figs. 10 and 11, but any other approved construction of the brake may be made, but the dimensions of the brake have to be in proportion to the size and weight of the automobile. In place of the cylinder and portion operated by compressed air, the piston may be operated by any other power-medium, such as the exhaust gases from the motor-engine, but owing to the convenience of resupplying and maintaining the required pressure for working the emergency-brake, the operation of the power-cylinder and piston by compressed air, is preferred.

By the emergency-brake many accidents may be avoided and effective means provided by which either the chauffeur or the persons occupying the automobile can quickly stop the same in case of danger, as the emergency-brake forms an additional safe-guard for the prevention of accidents to automobiles and the occupants of the same.

Having thus described my invention, I claim as new and desire to secure by Letters Patent:

1. An automatic emergency-brake for automobiles comprising, an air-tank, an air-cylinder having its inner end communicating with the air-tank and having a closed outer end, a piston movable in said cylinder, a brake operatively connected to the piston, a passage communicating with said closed outer end, and an emergency-valve in said passage, said cylinder being provided near its ends with air orifices communicating with the air-tank.

2. An automatic emergency-brake for automobiles comprising, an air-tank, an air-cylinder having one end open and in communication with the air-tank and the other end closed, a piston movable in said cylinder and having a rod passing through the closed end, a brake operatively connected with the piston rod, a coiled compression-spring on said rod and bearing against the piston and said closed end, a pipe communicating with said closed end, and an emergency-valve in said pipe, the side-wall of said cylinder being provided near said open end with pressure-equalizing orifices communicating with the air-tank, and near the closed end with air-orifices also communicating with the air-tank.

3. An automatic emergency-brake for automobiles, comprising an air-tank, a head for the same, an air-cylinder attached to said head and located at the interior of the air-tank, a spring-actuated piston in said cylinder, pressure-equalizing orifices near the inner end of the cylinder, an air-orifice in the cylinder near the head of the same, a piston-rod for said piston, a brake on the driving shaft of the automobile, a lever-transmission between the piston-rod and said brake, an emergency-valve provided with a handle, and a pipe connecting the emergency-valve with the air-cylinder.

4. An automatic emergency-brake for automobiles, comprising an air-tank, an air-cylinder in the same, a piston in said cylinder, a brake on the motor-shaft, a lever-transmission between the piston-rod and the brake, an emergency-valve connected with the air-cylinder, a handle for operating the emergency-valve, a lever-arm on the stem of the emergency-valve, and a clamping contact for said lever-arm, located in the igniter-circuit for applying the brake simultaneously with the stopping of the motor.

5. In an emergency-brake for automobiles, the combination of an air-tank, a pipe for supplying air under pressure to the same, a head attached to the opposite end of the tank, and provided with a stop, an air-cylinder in the tank attached at one end to the head and open at its opposite end, the cylinder being provided with pressure-equalizing holes near its open end and with an air-orifice near the head, a spring-actuated piston in the air-cylinder, and a piston-rod passing through a stuffing-box in the head, and an air outlet-pipe for the cylinder.

In testimony, that I claim the foregoing as my invention, I have signed my name in presence of subscribing witnesses.

EMIL EISELT.

Witnesses:
J. THEO. ZWERMANN,
HEDIVICH LÜTH,
RUDOLPH J. MOTZ.